Figure 1:
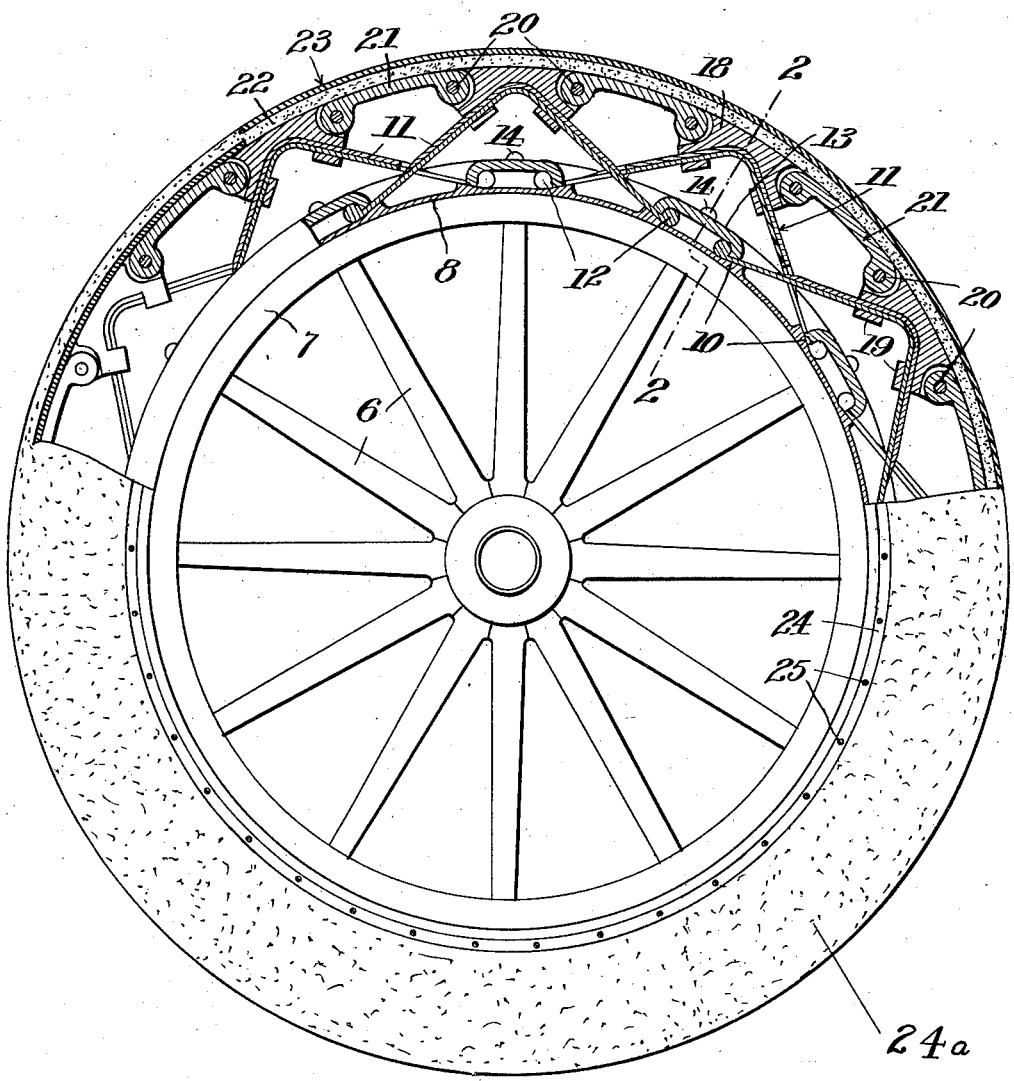

G. S. HOWE.
TIRE.
APPLICATION FILED MAY 6, 1911.

1,026,038.

Patented May 14, 1912.

2 SHEETS—SHEET 1.

WITNESSES

INVENTOR

Attorney

G. S. HOWE.
TIRE.
APPLICATION FILED MAY 6, 1911.
1,026,038.
Patented May 14, 1912.
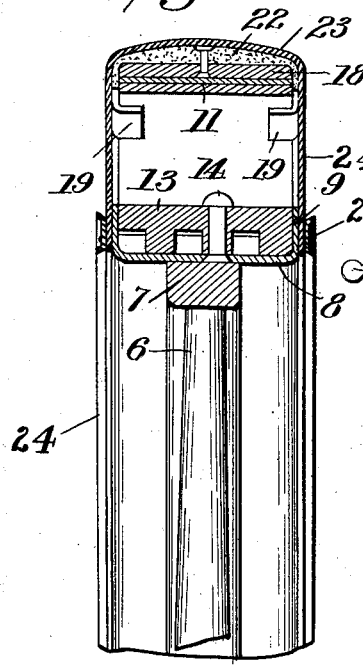
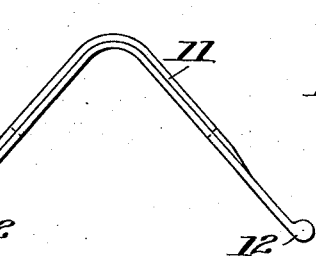
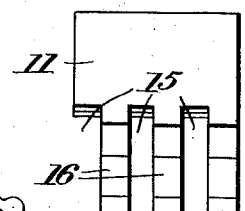
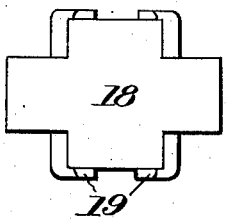
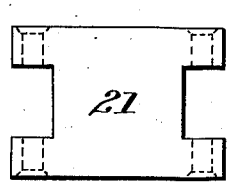
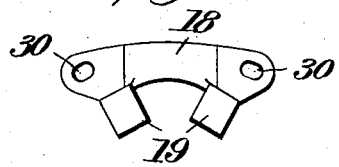
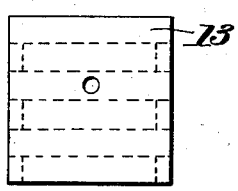
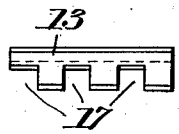

UNITED STATES PATENT OFFICE.

GEORGE S. HOWE, OF RICHMOND, VIRGINIA.

TIRE.

1,026,038.   Specification of Letters Patent.   Patented May 14, 1912.

Application filed May 6, 1911. Serial No. 625,613.

*To all whom it may concern:*

Be it known that I, GEORGE S. HOWE, a citizen of the United States, residing at Richmond, in the county of Henrico and State of Virginia, have invented certain new and useful Improvements in Tires, of which the following is a specification.

This invention relates to wheel tires, and particularly to that class thereof in which are employed steel springs for the purpose of giving the desired resiliency to the tire.

The object of the invention is to produce an improved structure of the kind, characterized particularly by the use of flat angular springs which are fastened to saddles or blocks forming the outer part of the tire structure, the inner ends of the springs working somewhat freely against a band or rim fixed to the felly, the saddles being connected by links, so as to form a flexible structure at the tread of the tire.

The invention is illustrated in the accompanying drawings in which—

Figure 1 is a side elevation of a wheel, partly in section and partly broken away, provided with the improvement. Fig. 2 is a section on the line 2—2 of Fig. 1. Figs. 3 and 4 are details in side and end elevation of one of the springs. Figs. 5 and 6 are details in plan and side view of one of the saddles or blocks to which the springs are attached. Fig. 7 is a detail in plan of one of the links. Figs. 8, 9 and 10 are details of one of the keepers for the free ends of the springs.

Referring specifically to the drawings 6 indicate the wheel spokes and 7 the felly. On the latter is mounted a channeled rim or band 8, with side flanges 9 projecting outwardly. Between the flanges the outer surface of this rim is shaped to form inclined seats 10 for the ends of the springs to rest on.

The springs 11 consist of two or more leaves bent transversely at the middle thereof to almost a right angle, and the ends of the lower leaf are enlarged or formed with beads 12. When the springs are in place said springs rest on the inclined surfaces of the seats 10, where they are confined by keepers 13, comprising curved plates which are riveted as at 14 to the rim 8. The opposite ends of each spring are slotted as indicated at 15, forming tongues 16 which terminate in the beads 12. The slots and tongues are alternately arranged so that the tongues of one spring will fit through the slots of the adjacent springs, whereby the springs are, so to speak, interlocked against relative transverse movement, but are free to move lengthwise to a limited extent, under impact or pressure, the ends of the springs sliding on the seats 10. The keeper plates 13 are also notched at their ends, as at 17, to permit the tongues 16 to pass therethrough, the notches being slightly larger than the thickness of the tongues, so that limited longitudinal movement is permitted, but the beads 12, when engaged by the plates, prevent withdrawal of the ends of the springs from the seats.

Each spring is fastened to a saddle or block 18, forming part of the outer tire structure, the fastening being conveniently effected by means of lips 19 projecting from opposite sides of the saddle and bent or pressed inwardly under the springs, thereby forming clips to hold the springs. The blocks are hinged as at 20 to links 21, said blocks and links forming in effect, a chain structure extending completely around the tire, the hinged joints permitting any block or section being pressed in or out to a limited extent, under impact or weight, which action is resisted by the springs 11. The peripheral surfaces of the saddles and links are in the same circumferential line, and they are covered by a band of leather 22, and this is covered by a rubber tread band 23, the sides 24ᵃ of which are folded inwardly beside the tire to inclose the metal parts and are fastened at their inner edges to the flanges 9 of the rim by means of rings 24 and screws 25, said rings extending around the tire on opposite sides thereof. The rubber cover thus makes a water and dust tight casing for the springs and associated parts.

In use, weight or pressure on the tire will compress the springs 11, the ends thereof sliding down the inclined seats 10, at least to the extent permitted by the slots 15, the chain structure yielding by means of the pivotal joints 20, and when the pressure is relieved the springs resume their normal position as in Fig. 1. The tire thus constructed will be free from the objections incident to pneumatic tires, and when the rubber cover 23 wears out another may be readily substituted by taking out the screws 25 and removing the rings 24. The interlocking engagement of the springs is very effective to prevent lateral displacement of the tire members, incident to running out of ruts, car tracks or the like. As shown in Fig. 6 the openings 30 in the saddles 18, to receive the hinge pins 20 are slightly elongated, to allow sufficient play between the saddles and the links.

Having thus described my invention, what I claim as new and desire to secure by Letters Patent is:—

1. A wheel tire comprising a rim, a flexible structure, including blocks, extending around the tire outside of the rim, a series of angular leaf springs attached to the blocks and bearing slidably at their ends against the rim, the springs being interlocked with each other against lateral movement, and means to retain the ends of the springs on the rim.

2. A wheel tire comprising a rim, a flexible structure, including blocks, extending around the tire outside of the rim, a series of angular leaf springs attached to the blocks and bearing slidably at their ends against the rim, the springs being slotted to form tongues which extend through the slots of adjacent springs to prevent relative lateral movement, and means to retain the springs between said rim and flexible structure.

3. A wheel tire comprising an inner rim, an outer flexible structure, a series of leaf springs fastened to said flexible structure and bearing slidably at their ends against the rim, the ends having projecting tongues interlocking with the tongues of adjacent springs, and keeper plates attached to the rim and engaging over said ends, the plates having notches through which the said tongues also extend.

4. A wheel tire comprising a rim, a series of blocks and connecting links therebetween, extending around the tire outside of the rim, said blocks having lips at opposite edges thereof, and a series of leaf springs between the blocks and the rim, the lips being bent over the edges of the springs and under the inner sides thereof to clamp the same to the blocks.

In testimony whereof, I affix my signature in presence of two witnesses.

GEORGE S. HOWE.

Witnesses:
JOHN T. HOWE,
M. A. CHILDRESS.

Copies of this patent may be obtained for five cents each, by addressing the "Commissioner of Patents Washington, D. C."